(12) United States Patent
Williams et al.

(10) Patent No.: US 7,712,049 B2
(45) Date of Patent: May 4, 2010

(54) TWO-DIMENSIONAL RADIAL USER INTERFACE FOR COMPUTER SOFTWARE APPLICATIONS

(75) Inventors: Cheryl L. Williams, Redmond, WA (US); Stephen D. Jensen, Monroe, WA (US); Robert F. Keohane, Redmond, WA (US); Richard H. Leukart, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 10/954,954

(22) Filed: Sep. 30, 2004

(65) Prior Publication Data

US 2006/0069603 A1 Mar. 30, 2006

(51) Int. Cl.
*G06F 3/00* (2006.01)
(52) U.S. Cl. .................. 715/834; 715/751; 715/752; 715/758; 715/706; 715/711; 715/715; 715/818; 715/816; 715/856; 715/810
(58) Field of Classification Search ................ 715/843, 715/834, 711, 808, 768, 706, 751, 758, 715, 715/816, 818, 810, 858
See application file for complete search history.

(56) References Cited

U.S. PATENT DOCUMENTS

| | | | |
|---|---|---|---|
| 5,202,828 A | 4/1993 | Vertelney et al. | ............ 714/810 |
| 5,493,692 A | 2/1996 | Theimer et al. | |
| 5,530,794 A | 6/1996 | Luebbert | .................. 715/524 |
| 5,537,628 A | 7/1996 | Luebbert | .................. 715/524 |
| 5,544,321 A | 8/1996 | Theimer et al. | |

(Continued)

FOREIGN PATENT DOCUMENTS

EP 0569133 A2 11/1993

(Continued)

OTHER PUBLICATIONS

The Design and implementation of Pie Menu; Copyright © 1991 by Don Hopkins; Originally published in Dr Dobb's Journal, pp. 1-7.*

(Continued)

*Primary Examiner*—Sy D. Luu
*Assistant Examiner*—Linh K Pham
(74) *Attorney, Agent, or Firm*—Merchant & Gould

(57) ABSTRACT

An improved user interface is provided for allowing the application of two properties or pieces of metadata to an object with a single user action. A two-dimensional radial menu (user interface) is provided. The radial menu is a generally pie-shaped user interface that is divided into two or more slices associated with two or more corresponding types of a first property that may be applied to a selected object. The menu is further divided to two or more circular sections so that each slice of the pie-shaped radial menu is further divided into two or more sections. Each circular section is associated with a type of a second property that may be applied to the object. By selection of a given section in a given slice of the radial menu, one type of the first property associated with the given slice and a one type of the second property associated with the given circular section of the slice are applied to the selected object with a single user action.

19 Claims, 3 Drawing Sheets

U.S. PATENT DOCUMENTS

| | | | |
|---|---|---|---|
| 5,555,376 A | 9/1996 | Theimer et al. | |
| 5,563,996 A | 10/1996 | Tchao | 715/521 |
| 5,596,656 A | 1/1997 | Goldberg | 382/186 |
| 5,603,054 A | 2/1997 | Theimer et al. | |
| 5,611,050 A | 3/1997 | Theimer et al. | |
| 5,625,783 A | 4/1997 | Ezekiel et al. | 395/352 |
| 5,625,810 A | 4/1997 | Kurosu et al. | 707/1 |
| 5,701,424 A * | 12/1997 | Atkinson | 715/808 |
| 5,724,595 A | 3/1998 | Gentner | 715/206 |
| 5,734,915 A | 3/1998 | Roewer | 395/773 |
| 5,752,254 A | 5/1998 | Sakairi | 715/530 |
| 5,760,768 A | 6/1998 | Gram | 345/333 |
| 5,761,683 A | 6/1998 | Logan et al. | 715/206 |
| 5,765,156 A | 6/1998 | Guzak et al. | 707/100 |
| 5,778,346 A | 7/1998 | Frid-Nielsen et al. | 705/9 |
| 5,781,192 A | 7/1998 | Kodimer | 715/770 |
| 5,798,760 A * | 8/1998 | Vayda et al. | 715/834 |
| 5,801,693 A | 9/1998 | Bailey | 715/769 |
| 5,812,865 A | 9/1998 | Theimer et al. | |
| 5,838,321 A | 11/1998 | Wolf | 345/343 |
| 5,855,006 A | 12/1998 | Huemoeller et al. | 705/9 |
| 5,870,552 A | 2/1999 | Dozier et al. | 715/234 |
| 5,884,306 A | 3/1999 | Bliss et al. | 707/7 |
| 5,898,434 A | 4/1999 | Small et al. | 715/810 |
| 5,924,099 A | 7/1999 | Guzak et al. | 707/100 |
| 5,940,078 A | 8/1999 | Nagarajayya et al. | 345/346 |
| 5,958,008 A | 9/1999 | Pogrebisky et al. | 709/203 |
| 5,970,455 A | 10/1999 | Wilcox et al. | 704/270 |
| 5,970,466 A | 10/1999 | Detjen et al. | 705/8 |
| 5,999,938 A | 12/1999 | Bliss et al. | 707/102 |
| 6,002,402 A | 12/1999 | Schacher | 715/810 |
| 6,025,837 A | 2/2000 | Matthews, III et al. | 715/721 |
| 6,034,686 A * | 3/2000 | Lamb et al. | 715/810 |
| 6,057,845 A | 5/2000 | Dupouy | 715/863 |
| 6,065,012 A | 5/2000 | Balsara et al. | 707/102 |
| 6,177,939 B1 | 1/2001 | Blish et al. | 715/770 |
| 6,233,591 B1 | 5/2001 | Sherman et al. | 715/205 |
| 6,249,283 B1 | 6/2001 | Ur | 715/764 |
| 6,262,724 B1 * | 7/2001 | Crow et al. | 715/723 |
| 6,269,389 B1 | 7/2001 | Ashe | 718/100 |
| 6,275,940 B1 | 8/2001 | Edwards et al. | 713/200 |
| 6,278,450 B1 | 8/2001 | Arcuri et al. | 345/334 |
| 6,282,548 B1 | 8/2001 | Burner et al. | 715/234 |
| 6,308,201 B1 | 10/2001 | Pivowar et al. | 709/214 |
| 6,309,305 B1 | 10/2001 | Kraft | 455/566 |
| 6,310,622 B1 * | 10/2001 | Asente | 345/441 |
| 6,310,634 B1 | 10/2001 | Bodnar et al. | 715/854 |
| 6,321,242 B1 | 11/2001 | Fogg et al. | 715/236 |
| 6,389,434 B1 | 5/2002 | Rivette et al. | 715/209 |
| 6,411,311 B1 | 6/2002 | Rich et al. | 715/769 |
| 6,429,882 B1 | 8/2002 | Abdelnur et al. | 345/763 |
| 6,433,801 B1 | 8/2002 | Moon et al. | 345/840 |
| 6,448,987 B1 * | 9/2002 | Easty et al. | 715/834 |
| 6,459,441 B1 | 10/2002 | Perroux et al. | 345/837 |
| 6,466,232 B1 | 10/2002 | Newell et al. | |
| 6,490,634 B2 | 12/2002 | Coiner | 719/329 |
| 6,499,041 B1 | 12/2002 | Breslau et al. | 715/505 |
| 6,513,046 B1 | 1/2003 | Abbott, III et al. | |
| 6,549,219 B2 * | 4/2003 | Selker | 715/834 |
| 6,549,915 B2 | 4/2003 | Abbott, III et al. | |
| 6,572,660 B1 | 6/2003 | Okamoto | 715/272 |
| 6,606,653 B1 | 8/2003 | Ackermann, Jr. et al. | 709/219 |
| 6,618,732 B1 | 9/2003 | White et al. | 707/103 |
| 6,651,059 B1 | 11/2003 | Sundaresan et al. | 707/6 |
| 6,686,938 B1 | 2/2004 | Jobs et al. | 345/835 |
| 6,694,087 B1 | 2/2004 | Weaver | 386/52 |
| 6,704,770 B1 | 3/2004 | Ramakesavan | 709/205 |
| 6,708,202 B1 | 3/2004 | Shuman et al. | 709/206 |
| 6,735,247 B2 | 5/2004 | Bates et al. | 382/282 |
| 6,747,675 B1 | 6/2004 | Abbott et al. | |
| 6,751,777 B2 | 6/2004 | Bates et al. | 715/205 |
| 6,763,496 B1 | 7/2004 | Hennings et al. | 715/205 |
| 6,789,228 B1 | 9/2004 | Merril et al. | 715/500.1 |
| 6,791,580 B1 | 9/2004 | Abbott et al. | |
| 6,801,223 B1 | 10/2004 | Abbott et al. | |
| 6,802,041 B1 | 10/2004 | Rehm | |
| 6,810,405 B1 | 10/2004 | LaRue et al. | 707/201 |
| 6,812,937 B1 | 11/2004 | Abbott et al. | |
| 6,826,729 B1 | 11/2004 | Giesen et al. | 715/837 |
| 6,836,270 B2 * | 12/2004 | Du | 345/419 |
| 6,842,877 B2 | 1/2005 | Robarts et al. | |
| 6,848,075 B1 | 1/2005 | Becker et al. | 715/205 |
| 6,918,091 B2 * | 7/2005 | Leavitt et al. | 715/765 |
| 6,924,797 B1 | 8/2005 | MacPhail | 345/326 |
| 6,925,496 B1 | 8/2005 | Ingram et al. | 709/224 |
| 6,944,821 B1 | 9/2005 | Bates et al. | 715/530 |
| 6,970,867 B1 | 11/2005 | Hsu et al. | 707/4 |
| 7,032,210 B2 | 4/2006 | Alloing et al. | 717/106 |
| 7,039,234 B2 | 5/2006 | Geidl et al. | 382/187 |
| 7,114,128 B2 | 9/2006 | Koppolu et al. | 715/781 |
| 7,143,338 B2 | 11/2006 | Bauchot et al. | 715/503 |
| 7,165,098 B1 | 1/2007 | Boyer et al. | 709/219 |
| 7,184,955 B2 | 2/2007 | Obrador et al. | 704/231 |
| 7,185,050 B2 | 2/2007 | Eld et al. | 709/203 |
| 7,188,073 B1 | 3/2007 | Tam et al. | 705/9 |
| 7,210,107 B2 * | 4/2007 | Wecker et al. | 715/863 |
| 7,254,785 B2 * | 8/2007 | Reed | 715/834 |
| 7,373,603 B1 | 5/2008 | Yalovsky et al. | 709/203 |
| 7,406,501 B2 * | 7/2008 | Szeto et al. | 709/206 |
| 7,454,763 B2 | 11/2008 | Veselova et al. | 719/329 |
| 7,460,713 B2 | 12/2008 | Lapstun et al. | 382/187 |
| 2001/0032214 A1 | 10/2001 | Bauchot et al. | 707/503 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0026478 A1 | 2/2002 | Rodgers et al. | 709/205 |
| 2002/0032689 A1 | 3/2002 | Abbott, III et al. | |
| 2002/0044152 A1 | 4/2002 | Abbott, III et al. | |
| 2002/0049785 A1 | 4/2002 | Bauchot | 707/503 |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078180 A1 | 6/2002 | Miyazawa | |
| 2002/0078204 A1 | 6/2002 | Newell | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087534 A1 | 7/2002 | Blackman et al. | 707/4 |
| 2002/0087642 A1 | 7/2002 | Wei et al. | 709/206 |
| 2002/0088008 A1 | 7/2002 | Markel | 725/135 |
| 2002/0089540 A1 | 7/2002 | Geier et al. | 345/764 |
| 2002/0091739 A1 | 7/2002 | Ferlitsch et al. | 707/526 |
| 2002/0099777 A1 | 7/2002 | Gupta et al. | 709/206 |
| 2002/0099817 A1 | 7/2002 | Abbott et al. | |
| 2002/0120697 A1 * | 8/2002 | Generous et al. | 709/206 |
| 2002/0133520 A1 | 9/2002 | Tanner | |
| 2002/0138582 A1 | 9/2002 | Chandra et al. | 709/206 |
| 2002/0140731 A1 | 10/2002 | Subramaniam et al. | 345/762 |
| 2002/0161800 A1 | 10/2002 | Eld et al. | 707/512 |
| 2002/0161804 A1 | 10/2002 | Chiu et al. | |
| 2002/0184264 A1 | 12/2002 | Berg et al. | 707/513 |
| 2002/0196293 A1 | 12/2002 | Suppan et al. | 345/853 |
| 2003/0013483 A1 | 1/2003 | Ausems et al. | |
| 2003/0014395 A1 | 1/2003 | Ruvolo et al. | 707/3 |
| 2003/0014490 A1 | 1/2003 | Bates et al. | 709/206 |
| 2003/0020749 A1 | 1/2003 | Abu-Hakima et al. | 345/752 |
| 2003/0023755 A1 | 1/2003 | Harris et al. | 709/246 |
| 2003/0046401 A1 | 3/2003 | Abbott et al. | |
| 2003/0050927 A1 | 3/2003 | Hussam | 707/5 |
| 2003/0069877 A1 | 4/2003 | Grefenstette et al. | 707/2 |

| | | | | | | |
|---|---|---|---|---|---|---|
| 2003/0070143 A1 | 4/2003 | Maslov ........................ 715/513 | | 2006/0139709 A1 | 6/2006 | Bifano et al. ................. 358/527 |
| 2003/0076352 A1 | 4/2003 | Uhlig et al. ................... 715/738 | | 2006/0150109 A1* | 7/2006 | Schultz et al. ............... 715/759 |
| 2003/0084104 A1 | 5/2003 | Salem et al. | | 2006/0195461 A1 | 8/2006 | Lo et al. ...................... 707/100 |
| 2003/0088534 A1 | 5/2003 | Kalantar et al. ................ 706/50 | | 2007/0022372 A1 | 1/2007 | Liu et al. |
| 2003/0097361 A1 | 5/2003 | Huang et al. ................... 707/10 | | 2007/0124325 A1 | 5/2007 | Moore et al. ................. 707/102 |
| 2003/0100999 A1* | 5/2003 | Markowitz .................... 702/20 | | 2007/0156627 A1 | 7/2007 | D'Alicandro ................... 707/1 |
| 2003/0135565 A1 | 7/2003 | Estrada ........................ 709/206 | | 2007/0156643 A1 | 7/2007 | Dev Sareen et al. ............ 707/2 |
| 2003/0154254 A1 | 8/2003 | Awasthi ........................ 709/206 | | 2007/0168278 A1 | 7/2007 | Peterson et al. ................ 705/38 |
| 2003/0154476 A1 | 8/2003 | Abbott, III et al. | | 2007/0168378 A1 | 7/2007 | Sareen et al. ............... 707/102 |
| 2003/0172168 A1 | 9/2003 | Mak et al. | | 2007/0245223 A1 | 10/2007 | Siedzik et al. ............. 715/500.1 |
| 2003/0172384 A1 | 9/2003 | Comps | | 2007/0245229 A1 | 10/2007 | Siedzik et al. ............... 715/512 |
| 2003/0182450 A1 | 9/2003 | Ong et al. .................... 709/246 | | 2008/0115048 A1 | 5/2008 | Veselova et al. ............. 715/205 |
| 2003/0187930 A1 | 10/2003 | Ghaffar et al. | | 2008/0115069 A1 | 5/2008 | Veselova ..................... 715/760 |
| 2003/0196196 A1 | 10/2003 | Nylander et al. | | | | |
| 2003/0212680 A1 | 11/2003 | Bates et al. ..................... 707/7 | | | | |
| 2003/0222899 A1 | 12/2003 | Alvesalo | | | | |
| 2004/0001093 A1 | 1/2004 | Sellers et al. ................ 345/766 | | | | |
| 2004/0039779 A1 | 2/2004 | Amstrong et al. ........... 709/204 | | | | |
| 2004/0054736 A1* | 3/2004 | Daniell et al. ............... 709/206 | | | | |
| 2004/0063400 A1 | 4/2004 | Kim | | | | |
| 2004/0073679 A1 | 4/2004 | Martens et al. .............. 709/227 | | | | |
| 2004/0098398 A1 | 5/2004 | Ahn et al. | | | | |
| 2004/0109033 A1 | 6/2004 | Vienneau et al. ............ 345/863 | | | | |
| 2004/0128613 A1 | 7/2004 | Sinisi | | | | |
| 2004/0153445 A1 | 8/2004 | Horvitz et al. .................. 707/3 | | | | |
| 2004/0158611 A1* | 8/2004 | Daniell et al. ............... 709/206 | | | | |
| 2004/0168119 A1 | 8/2004 | Liu et al. ................... 715/501.1 | | | | |
| 2004/0172455 A1* | 9/2004 | Green et al. ................. 709/207 | | | | |
| 2004/0174392 A1* | 9/2004 | Bjoernsen et al. ........... 345/751 | | | | |
| 2004/0177122 A1* | 9/2004 | Appelman et al. .......... 709/206 | | | | |
| 2004/0177319 A1 | 9/2004 | Horn ........................ 715/501.1 | | | | |
| 2004/0189694 A1 | 9/2004 | Kurtz et al. .................. 345/738 | | | | |
| 2004/0194025 A1 | 9/2004 | Hubert et al. ................ 715/513 | | | | |
| 2004/0221243 A1* | 11/2004 | Twerdahl et al. ............ 715/834 | | | | |
| 2004/0230599 A1 | 11/2004 | Moore et al. ................. 707/102 | | | | |
| 2004/0243677 A1 | 12/2004 | Curbow et al. .............. 709/206 | | | | |
| 2004/0243941 A1* | 12/2004 | Fish ........................... 715/752 | | | | |
| 2004/0267625 A1* | 12/2004 | Feng et al. .................... 705/26 | | | | |
| 2004/0267706 A1 | 12/2004 | Springer et al. ................ 707/3 | | | | |
| 2004/0268231 A1 | 12/2004 | Tunning ..................... 715/513 | | | | |
| 2004/0268263 A1* | 12/2004 | Van Dok et al. ............. 715/733 | | | | |
| 2005/0010871 A1 | 1/2005 | Ruthfield et al. ............. 715/712 | | | | |
| 2005/0034078 A1 | 2/2005 | Abbott et al. | | | | |
| 2005/0055424 A1 | 3/2005 | Smith ........................ 709/219 | | | | |
| 2005/0064852 A1 | 3/2005 | Baldursson | | | | |
| 2005/0102365 A1* | 5/2005 | Moore et al. ................. 709/207 | | | | |
| 2005/0102607 A1 | 5/2005 | Rousselle et al. ........ 715/501.1 | | | | |
| 2005/0102639 A1 | 5/2005 | Dove | | | | |
| 2005/0108619 A1 | 5/2005 | Theall et al. ................. 715/229 | | | | |
| 2005/0114521 A1 | 5/2005 | Lee | | | | |
| 2005/0119018 A1 | 6/2005 | Kim | | | | |
| 2005/0125717 A1 | 6/2005 | Segal et al. | | | | |
| 2005/0142528 A1 | 6/2005 | Veselova ..................... 434/307 | | | | |
| 2005/0149851 A1 | 7/2005 | Mittal ........................ 715/205 | | | | |
| 2005/0154761 A1 | 7/2005 | Lee et al. .................. 707/104.1 | | | | |
| 2005/0165795 A1 | 7/2005 | Myka et al. ................. 707/100 | | | | |
| 2005/0166154 A1* | 7/2005 | Wilson et al. ............... 715/751 | | | | |
| 2005/0175089 A1 | 8/2005 | Jung | | | | |
| 2005/0183008 A1 | 8/2005 | Crider et al. ................. 715/517 | | | | |
| 2005/0208962 A1 | 9/2005 | Kim | | | | |
| 2005/0233744 A1 | 10/2005 | Karaoguz | | | | |
| 2005/0240590 A1 | 10/2005 | Shimizu et al. ................. 707/9 | | | | |
| 2005/0245241 A1 | 11/2005 | Durand | | | | |
| 2005/0286414 A1 | 12/2005 | Young et al. ................. 370/216 | | | | |
| 2005/0289109 A1 | 12/2005 | Arrouye et al. ................. 707/1 | | | | |
| 2006/0047704 A1 | 3/2006 | Gopalkrishnan ........ 707/104.1 | | | | |
| 2006/0053379 A1* | 3/2006 | Henderson et al. .......... 715/751 | | | | |
| 2006/0069603 A1 | 3/2006 | Williams et al. ............... 705/9 | | | | |
| 2006/0069617 A1 | 3/2006 | Milener et al. ........... 715/501.1 | | | | |
| 2006/0074844 A1 | 4/2006 | Frankel .......................... 707/1 | | | | |
| 2006/0075347 A1 | 4/2006 | Rehm ......................... 715/727 | | | | |
| 2006/0075360 A1 | 4/2006 | Bixler ........................ 715/805 | | | | |
| 2006/0095452 A1 | 5/2006 | Jansson et al. | | | | |

FOREIGN PATENT DOCUMENTS

| | | |
|---|---|---|
| EP | 1223503 | 7/2002 |
| EP | 1376337 | 2/2004 |
| EP | 1 630 694 A2 | 3/2006 |
| GB | 2391148 | 1/2004 |
| JP | 2001-265753 A | 9/2001 |
| WO | WO 98/00787 | 8/1998 |
| WO | WO 2004/038548 A2 | 5/2004 |
| WO | WO 2004/086254 A1 | 10/2004 |
| WO | WO 2005001709 A2 | 1/2005 |
| WO | WO 2004/038548 A3 | 4/2005 |
| WO | WO 2004/038548 R4 | 4/2005 |
| WO | WO 2005/067328 A1 | 7/2005 |
| WO | WO 2005/110010 A2 | 11/2005 |
| WO | WO 2007081783 A2 | 7/2007 |
| WO | WO 2007081783 A3 | 7/2007 |
| WO | WO 2007081786 A2 | 7/2007 |
| WO | WO 2007081786 A3 | 7/2007 |

OTHER PUBLICATIONS

Hopkins, the article "The Design and Implementation of the Pie Menus", 1991.*
Hopkins, the article "The Design and Implementation of the Pie Menus", Dec. 1991.*
Charles Rich, Candace L. Sidner, "Segmented Interaction History in a Collaborative Interface Agent," 1997 ACM, pp. 23-30.
Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
U.S. Official Action mailed Dec. 23, 2003 in U.S. Appl. No. 09/896,384.
U.S. Official Action mailed Aug. 24, 2004 in U.S. Appl. No. 09/896,384.
U.S. Appl. No. 10/982,073, filed Nov. 5, 2004, entitled "Gallery User Interface Controls".
U.S. Appl. No. 10/836,154, filed Apr. 30, 2004, entitled "Combined Content Selection and Display User Interface".
U.S. Appl. No. 10/848,774, filed May 19, 2004, entitled "Automatic Grouping of Electronic Mail".
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
U.S. Appl. No. 10/851,506, filed May 21, 2004, entitled "Adaptive Multi-Line View User Interface".
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Office, Sep. 19, 2006.

U.S. Appl. No. 10/955,940, filed Sep. 30, 2004, entitled "User Interface for Displaying Selectable Software Functionality Controls that are Contextually Relevant to a Selected Object".
U.S. Appl. No. 10/955,967, filed Sep. 30, 2004, entitled "Command User Interface for Displaying Selectable Software Functionality Controls".
U.S. Appl. No.10/955,942, filed Sep. 30, 2004, entitled "User Interface for Displaying a Gallery of Formatting Options Applicable to a Selected Object".
U.S. Appl. No. 10/955,928, filed Sep. 30, 2004, entitled "User Interface for Providing Task Management and Calendar Information".
U.S. Appl. No. 10/955,967, filed Sep. 30, 2004, entitled "Command User Interface for Displaying Selectable Software Functionality Controls".
U.S. Official Action mailed Apr. 27, 2006 in U.S. Appl. No. 10/800,056.
Amendment to Office Action of Apr. 27, 2006, dated Jul. 27, 2006 in U.S. Appl. No. 10/800,056.
U.S. Official Action mailed Oct. 19, 2006 in U.S. Appl. No. 10/800,056.
Amendment to Office Action of Oct. 19, 2006, dated Jan. 19, 2007 in U.S. Appl. No. 10/800,056.
U.S. Appl. No. 10/800,056, filed Mar. 12, 2004, entitled "Method and System for Data Binding in a Block Structured User Interface Scripting Language".
Khare and Rifkin, "The Origin of (Document) Species," University of California, 1998 (9 pages).
"Separate Structure and Presentation," http://www.webreference.com/html/tutorial5/1.html, Aug. 20, 1998 (4 pages).
"The Style Attribute and CSS Declarations," http://www.webreference.com/html/tutorial5/2, Aug. 20, 1998 (4 pages).
"What's Hot in Internet Services?," http://www.webreference.com/html/tutorial5/3, Aug. 20, 1998 (3 pages).
"The Style Element & CSS Selectors," http://www.webreference.com/html/tutorial5/4.html, Aug. 20, 1998 (e pages).
http://www/webreference.com/html/tutorial5/5.html, Aug. 20, 1998 (3 pages).
"ID & Class Selectors, Pseudoclasses," http://www.webreference.com/html/tutorial5/6.html, Aug. 20, 1998 (3 pages).
http://www.webreference.com/html/tutorial5/7.html, Aug. 20, 1998 (3 pages).
http://www.webreference.com/html/tutorial5/8.html, Aug. 20, 1998 (2 pages).
"External Style Sheets," http://www.webreference.com/html/tutorial5/10.html, Aug. 20, 1998 (3 pages).
Raman, "Cascaded Speech Style Sheets," 1997 (9 pages).
"Primary Windows," http://www-03.ibm.com/servers/eserver/iseries/navigator/guidelines/primary.html, 2002-2008 (23 pages).
"User Interface Standards," http://msdn2.microsoftt.com/en-us/library/aa217660(office.11,d=printer).aspx, Sep. 2001 (5 pages).
"WebSphere Studio Overview," http://researchweb.watson.ibm.com/journal/sj/432/budinsky.html, May 6, 2004 (25 pages).
U.S. Official Action mailed Feb. 14, 2007 in U.S. Appl. No. 10/800,056.
U.S. Appl. No. 10/420,621 filed Apr. 22, 2003, entitled "Creation and Recognition of Specially-Marked Items in Notes".
U.S. Appl. No. 10/387,287 filed Mar. 12, 2003, entitled "System and Method for Customizing Note Flags".
U.S. Appl. No. 10/397,103 filed Mar. 26, 2003, entitled "System and Method for Linking Page Content with a Media File and Displaying the Links".
U.S. Official Action mailed Oct. 19, 2004 in U.S. Appl. No. 10/397,103.
U.S. Official Action mailed Sep. 23, 2005 in U.S. Appl. No. 10/420,621.
U.S. Official Action mailed Mar. 6, 2006 in U.S. Appl. No. 10/664,740.
U.S. Official Action mailed Jun. 12, 2006 in U.S. Appl. No. 10/387,287.
U.S. Official Action mailed Jun. 13, 2006 in U.S. Appl. No. 10/420,621.
U.S. Official Action mailed Oct. 24, 2006 in U.S. Appl. No. 10/664,740.
U.S. Official Action mailed Feb. 7, 2007 in U.S. Appl. No. 10/387,287.
U.S. Official Action mailed Feb. 20, 2007 in U.S. Appl. No. 10/420,621.
U.S. Official Action mailed Apr. 19, 2007 in U.S. Appl. No. 10/397,103.
U.S. Official Action mailed Jul. 13, 2007 in U.S. Appl. No. 10/664,740.
U.S. Official Action mailed Jul. 16, 2007 in U.S. Appl. No. 11/063,309.
U.S. Official Action mailed Oct. 19, 2007 in U.S. Appl. No. 10/387,287.
U.S. Official Action mailed Nov. 5, 2007 in U.S. Appl. No. 10/420,621.
U.S. Official Action mailed Jan. 7, 2008 in U.S. Appl. No. 10/397,103.
Official Action mailed Jan. 7, 2008 in U.S. Appl. No. 11/063,309.
U.S. Official Action mailed Mar. 10, 2008 in U.S. Appl. No. 10/955,232.
U.S. Official Action mailed May 12, 2008 in U.S. Appl. No. 10/397,103.
U.S. Official Action mailed Feb. 21, 2008 in U.S. Appl. No. 11/326,110.
U.S. Official Action mailed Mar. 5, 2008 in U.S. Appl. No. 11/326,583.
U.S. Official Action mailed Jul. 9, 2008 in U.S. Appl. No. 10/387,287.
U.S. Official Action mailed Nov. 12, 2008 in U.S. Appl. No. 10/955,232.
U.S. Official Action mailed Nov. 17, 2008 in U.S. Appl. No. 11/326,110.
U.S. Official Action mailed Dec. 10, 2008 in U.S. Appl. No. 11/326,583.
U.S. Official Action mailed Dec. 24, 2008 in U.S. Appl. No. 10/420,621.
U.S. Official Action mailed Mar. 13, 2009 in U.S. Appl. No. 10/955,232.
U.S. Official Action mailed Mar. 18, 2009 in U.S. Appl. No. 10/387,287.
U.S. Official Action mailed May 20, 2009 in U.S. Appl. No. 11/599,598.
U.S. Official Action mailed Jun. 11, 2009 in U.S. Appl. No. 11/599,626.
U.S. Official Action mailed Jun. 15, 2009 in U.S. Appl. No. 10/420,621.
PCT Search Report mailed Jun. 22, 2007 in PCT/US2007/000248.
PCT Search Report mailed Jun. 22, 2007 in PCT/US2007/000244.
Chinese First Office Action mailed Oct. 31, 2008 in 200510088531.1.
European Search Report mailed Jan. 30, 2009 in 07717882.0-1527/1977340.
European Search Report mailed Jan. 30, 2009 in 07717837.4-1527/1977339.
European Examination Report mailed Mar. 25, 2009 in 07717882.0-1527/1977340.
European Examination Report mailed Apr. 1, 2009 in 07717837.4-1527/1977339.
Mexican Official Action dated Feb. 20, 2009 in PA/a/2005/007147 - English Translation Only.
Microsoft Corporation, "Microsoft Snipping Tool for Tablet PC Preview Release Help: Capturing Clips; Capturing Regions; Displaying or Hiding Links", Nov. 2002, 4 pp.
Leszynski Group, "News Story: Leszynski Group Powers Bill Gates' Tablet PC Launch Keynote", Nov. 2002, 1 pp.
Leszynski Group, "Tablet PC Solutions", Nov. 2002, 3 pp.
IBM Corporation, "Dragging Marked Data to an Editor Window", Technical Disclosure Bulletin, Mar. 1992, vol. 34, No. 10B, pp. 202-203.
IBM Corporation, "Source Dimension Copying Using the Standard Clipboard", Technical Disclosure Bulletin, Aug. 1994, vol. 37, No. 8, pp. 419-420.
IBM Corporation, "Multiple Item On-Line Clipboard", Technical Disclosure Bulletin, Jul. 1992, No. 2, pp. 425.

Apperley, M. et al., "Breaking the Copy/Paste Cycle: The Stretchable Selection Tool", Computer Science Department, New Zealand, Feb. 2000, pp. 1-8.

Rich, Charles and Sidner, Candace L., "Segmented Interaction History in a Collaborative Interface Agent," 1997 ACM, pp. 23-30.

Dwelly, Andrew, "Functions and Dynamic User Interfaces, " 1989 ACM, pp. 371-381.

Kurtenbach, Gordon et al.., "The Hotbox: Efficient Access to a Large Number Of Menu-items," ACM 1999, pp. 231-237.

Rich, Charles and Sidner, Candace L., "Adding a Collaborative Agent to Graphical User Interfaces, " 1996 ACM, pp. 21-30.

Boyce, Jim, "Microsoft Outlook Inside Out," 2001, Redmond, Washington, pp. 67, 68, 109, 110, 230, 231, 310, 316-318, 798.

Halvorson, Michael and Young, Michael, "Microsoft Office XP Inside Out," 2001, Redmond, Washington, pp. 1005-1009, 1015, 1023-1028, 1036-1039, 1093.

Riggsby, Matt et al., "Mastering Lotus Notes and Domino 6," 2003, Alameda, California, pp. 135-139.

Riggsby, Matt, et al., "Mastering Lotus Notes and Domino 6," 2003, Alameda, California, pp. 135-138, 607-612.

"Primary Windows," http.//www-03.ibm.com/severs/eserver/iseries/navigator/guidelines/primary, date unknown (printed Feb. 23, 2007, 23 pp.

Schumaker, Dennis, "User Interface Standards," http://msdn2.microsofft.com/en-us/library/aa217660(office.11.d=printer).aspx, Sep. 2001, 5 pages.

Budinsky, F. et al., "WebSphere Studio Overview," http://researchweb.watson.ibm.com/journal/sj/432/budinsky.html, May 6, 2004, 25 pages.

Padwick, Gordon, Ebook titled "Special Edition Using Microsoft Outlook 2002", published May 17, 2001, pp. 1-7.

"Evermore Integrated Office if the 'First REAL Office'", Evermore Software Ltd., 2001-2004, retrieved Jan. 24, 2007, http://web.archive.org/web/20040106195344/www.evermoresw.com/weben/product/eio_..., 2 pp.

Young et al., "Microsoft Office System Inside Out: 2003 Edition", published Sep. 10, 2003, pp. 1-168.

"Setting Reminders in Outlook", California Lutheran University Information Systems and Services, Nov. 2005, 3 pp.

Slovak, Ken, "Absolute Beginner's Guide to Microsoft Office Outlook 2003", Que, Oct. 1, 2003; Chapter 1: Personal Information Management, Chapter 2: Working in Outlook's User Interface, Chapter 4: Flagging E-Mails and E-Mail Reminders, Chapter 7, Chapter 12: Using Advanced Find, 6 pp.

Gnome 2.8 Desktop User Guide, Sun Gnome Documentation Team, 2004, 67 pp.

Braun, Owen, "Owen Braun: OneNote 12: Linking related notes together (really)", Date: Oct. 6, 2005, http://blogs.msdn.com/owen_braun/archive/2005/10/06/477615.aspx, 6 pp.

Braun, Owen, "Owen Braun: OneNote 12: Linking related notes together", Date: Oct. 6, 2005, http://blogs.msdn.com/owen_braun/archive/2005/10/06/477610.aspx, 2 pp.

Braun, Owen, "Owen Braun: OneNote 12: New Extensibility in OneNote 12", Date: Oct. 6, 2005, hilp://blogs.msdn.com/owen_braun/archive/2005/12/15/503879.aspx, 2 pp.

"SOHO Notes Tour: Note-Taking", http://www.chronosnet.com/Products/sohonotes/sn_notetaking.html, Date Unknown, 3 pp.

Henzinger, Monica, "Link Analysis in Web Information Retrieval", Date: 2000, http://www.acm.org/sigs/sigmod/disc/disc01/out/websites/deb_september/henzinge.pdf, 6 pp.

"Accessibility Essentials 2 Authoring Accessible Documents - Inserting Hyperlinks: Linking internally within a document", http://www.techdis.ac.uk/resources/sites/accessibilityessentials2/modules/authoring%20accessible%20docs/hyperlink%20internally.html, Date Unknown, 4 pp.

"Tomboy: Simple Note Taking", Date: 2004-2006, http://www.beatniksoftware.com/tomboy/, 4 pp.

Kraynak, Joe, "Absolute Beginner's Guide to Microsoft Office Excel 2003", Que, Sep. 2003, 14 pp.

Richard, "Microsoft Office 2004 for Mac in a Snap", Sams, Aug. 2004, 17 pp.

"Microsoft Office 2003 Editions Product Guide", Internet Publication, Sep. 2003, 168 pp.

U.S. Office Action dated May 21, 2009 cited in U.S. Appl. No. 11/326,583.

Chinese Second Office Action dated Jul. 10, 2009 cited in U.S. Appl. No. 200510088531.1.

Lewis, "Easy Microsoft Office 2003", Sep. 2003, 10 pgs.

Microsoft Press, "Microsoft Windows User Experience", 1999, pp. 51-52.

Long, Jr., et al., "A Prototype User Interface for A Mobile Multimedia Terminal," Department of Electrical Engineering and Computer Sciences, The University of California at Berkeley, Berkeley, CA. http://sigchi.org/chi95/Electronic/documents/intex;/acl_bdy.htm, retrieved Jan. 10, 2006, 4 pgs.

Landay, et al., "NotePals: Sharing and Synchronizing Handwritten Notes with Multimedia Documents," EECS Department, University of California, Berkeley, CA http://www.cs.berkeley.edu/~landay/research/publications/hcscw/HCSCW-NotePals.html, retrieved Jan. 10, 2006, 8 pgs.

Singh, et al., "Collaborative Note Taking Using PDAs" Department of Computer Science, Naval Postgraduate School, Monterey, CA - http://www.fxpal.com/people/denoue/publications/jise_2005.pdf, 2005, pp. 835-848.

Weverka, Microsoft Office OneNote 2003, Step by Step, http://proquest.safaribooksonline.com/0735621098, Microsoft Press, Jul. 13, 2004, pp. 1-64.

Harter et al., A Distributed Location System for the Active Office, IEEE Network, 1994, pp. 62-70.

Chen et al., A Survey of Context-Aware Mobile Computing Research, Dartmouth Computer Science Technical Report, 2000, 16 pgs.

Schilit, A System Architecture for Context-Aware Mobile Computing, Columbia University, 1995, 153 pgs.

Spreitzer et al., Providing Location Information in a Ubiquitous Computing Environment, SIGOPS '93, 1993, pp. 270-283.

Theimer et al., Operating System Issues for PDAs, In Fourth Workshop on Workstation Operating Systems, 1993, 7 pgs.

Want, Active Badges and Personal Interactive Computing Objects, IEEE Transactions on Consumer Electronics, 1992, 11 pp., vol. 38 - No. 1.

Schilit et al., The ParcTab Mobile Computing System, IEEE WWOS-IV, 1993, 4 pgs.

Schilit et al., Context-Aware Computing Applications, In Proceedings of the Workshop on Mobile Computing Systems and Applications, Dec. 1994. pp. 85-90.

Schilit et al., Customizing Mobile Applications, Proceedings USENIX Symposium on Mobile and Location Independent Computing, Aug. 1993, 9 pgs.

Spreitzer et al., Architectural Considerations for Scalable, Secure, Mobile Computing with Location Information, In The 14th International Conference on Distributed Computing Systems, Jun. 1994, pp. 29-38.

Spreitzer et al., Scalable, Secure, Mobile Computing with Location Information, Communications of the ACM, Jul. 1993, 1 page, vol. 36 - No. 7.

Want et al., The Active Badge Location System, ACM Transactions on Information Systems, Jan. 1992, pp. 91-102, vol. 10 - No. 1.

Weiser, Some Computer Science Issues in Ubiquitous Computing, Communications of the ACM, Jul. 1993, pp. 75-84, vol. 36 - No. 7.

Billinghurst et al., An Evaluation of Wearable Information Spaces, Proceedings of the Virtual Reality Annual International Symposium, 1998, 8 pgs.

Rhodes, Remembrance Agent: A continuously running automated information retrieval system, The Proceedings of The First International Conference on The Practical Application Of Intelligent Agents and Multi Agent Technology, 1996, pp. 487-495.

Horvitz et al., In Pursuit of Effective Handsfree Decision Support: Coupling Bayesian Inference, Speech Understanding, and User Models, 1995, 8 pgs.

Rhodes, The Wearable Remembrance Agent: A System for Augmented Theory, The Proceedings of The First International Symposium on Wearable Computers, Oct. 1997, pp. 123-128.

Horvitz et al., Attention-Sensitive Alerting in Computing Systems, Microsoft Research, Aug. 1999.

Schilit et al., Disseminating Active Map Information to Mobile Hosts, IEEE Network, 1994, pgs. 22-32, vol. 8, No. 5.

Billinghurst et al., Wearable Devices: New Ways to Manage Information, IEEE Computer Society, Jan. 1999, pp. 57-64.

Starner, Wearable Computing and Contextual Awareness, Massachusetts Institute of Technology, Jun. 1999, 248 pgs.

Rhodes, The Wearable Remembrance Agent: A System for Augmented Memory, Personal Technologies Journal Special Issue on Wearable Computing, 1997, 12 pgs.

Workshop on Wearable Computing Systems, Aug. 19-21, 1996, 3 pgs.

Billinghurst, Research Directions in Wearable Computing, University of Washington, May, 1998, 48 pgs.

Weiser, The Computer for the 21st Century, Scientific American, Sep. 1991, 8 pgs.

Joachims, Text categorization with support vector machines: learning with many relevant features, Machine Learning, European Conference on Machine Learning, Apr. 21, 1998, pp. 137-142.

International Search Report dated Sep. 29, 2003 for PCT Application No. 00/20685, 3 pgs.

Losee, Jr., Minimizing information overload: the ranking of electronic messages, Journal of Information Science 15, Elsevier Science Publishers B.V., 1989, pp. 179-189.

U.S. Office Action mailed Dec. 11, 2008 cited in U.S. Appl. No. 11/405,251.

U.S. Office Action mailed Jun. 11, 2009 cited in U.S. Appl. No. 11/405,256.

U.S. Final Office Action mailed Jul. 17, 2009 cited in U.S. Appl. No. 11/405,251.

U.S. Office Action mailed Aug. 7, 2009 cited in U.S. Appl. No. 11/326,110.

PCT Search Report dated Aug. 27, 2007 in PCT/US2007/007233.

PCT Search Report dated Sep. 21, 2007 in PCT/US2007/007231.

U.S. Office Action dated Oct. 14, 2009 cited in U.S. Appl. No. 10/955,232.

U.S. Office Action dated Oct. 19, 2009 cited in U.S. Appl. No. 11/599,598.

Russian Office Action dated Jun. 15, 2009 cited in U.S. Appl. No. 2005120371/09(023031).

European Examination dated Oct. 6, 2009 cited in U.S. Appl. No. 07 717 882.0/1527.

European Examination dated Oct. 6, 2009 cited in U.S. Appl. No. 07 717 837.Apr. 1527.

Chinese First Office Action dated Oct. 30, 2009 cited in Chinese Application No. 200780001988.1.

Kamel et al, "Retrieving Electronic Ink by Content," Multimedia Database Management Systems, 1996, Proceedings of International Workshop on Aug. 14-16, 1996, pp. 54-61.

U.S. Office Action dated Dec. 23, 2009 cited in U.S. Appl. No. 11/405,251.

Chinese First Office Action dated Dec. 18, 2009 cited in Application No. 200780001911.4.

U.S. Final Office Action dated Feb. 4, 2010 cited in U.S. Appl. No. 11/405,256.

* cited by examiner

TWO-DIMENSIONAL RADIAL USER INTERFACE FOR COMPUTER SOFTWARE APPLICATIONS

FIELD OF THE INVENTION

The present invention generally relates to computer software user interfaces. More particularly, the present invention relates to a two-dimensional radial user interface for computer software applications.

BACKGROUND OF THE INVENTION

With the advent of the computer age, computer and software users have grown accustomed to user-friendly software applications that help them write, calculate, organize, prepare presentations, send and receive electronic mail, make music, and the like. For example, electronic word processing applications allow users to prepare a variety of useful documents. Spreadsheet applications allow users to enter, manipulate, and organize data. Electronic mail systems allow users to send, receive, respond to and store a variety of mail messages and related information. Electronic calendar systems allow users to store, organize and view meeting dates, appointments and tasks. Electronic task management applications allow users to store, organize and view a variety of tasks that a use must complete or that a user desires to complete according to various time schedules.

In many instances, users are required to apply multiple properties or pieces of metadata to an object such as a text entry, data entry, calendar item or electronic task item. For example, for a text entry, a user may desire to boldface the entry and change the font size of the entry. For another example, for an electronic task item in a task management system, a user may desire to both set a start date for a task item and assign one or more user-defined task categories to the task item. According to typical software applications, in order to apply more than one property or piece of metadata to an object, a user must select or enter the more than one property or piece of metadata separately with separate user actions. Moreover, often more than one property or piece of metadata applied to a given object must come from multiple sources, for example two different user interfaces.

Accordingly, there is a need for an improved user interface for allowing a user to apply more than one property or piece of metadata to an object with a single user action. It is with respect to these and other considerations that the present invention has been made.

SUMMARY OF THE INVENTION

Embodiments of the present invention solve the above and other problems by providing an improved user interface for allowing the application of more than one property or piece of metadata to an object with a single user action. According to aspects of the present invention, a two-dimensional radial menu (user interface) is provided. The radial menu is a generally pie-shaped user interface that is divided into two or more slices associated with two or more corresponding types of a first property that may be applied to a selected object. The menu is further divided to two or more circular sections so that each slice of the pie-shaped radial menu is further divided into two or more sections. Each circular section is associated with a type of a second property that may be applied to the object. By selection of a given section in a given slice of the radial menu, one type of the first property associated with the given slice and a one type of the second property associated with the given circular section of the slice are applied to the selected object with a single user action.

According to a more particular aspect of the invention, the radial menu is utilized for application of properties to flagged electronic correspondence items for creating electronic tasks for a tasks application, calendar application or electronic to-do list. According to this aspect, the radial menu is first divided into slices corresponding to user-defined task categories, and the radial menu is next divided by concentric circles corresponding to start times for created tasks. Thus, by selection of a given section of the radial menu according to this aspect of the invention, a created task may receive a task category and a task start date in response to a single user action. Selection of different areas of the radial menu causes application of different combinations of different types of the category property and of the start date property to the selected task item.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, an improved user interface for allowing the application of more than one property or piece of metadata to an object with a single user action is provided. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
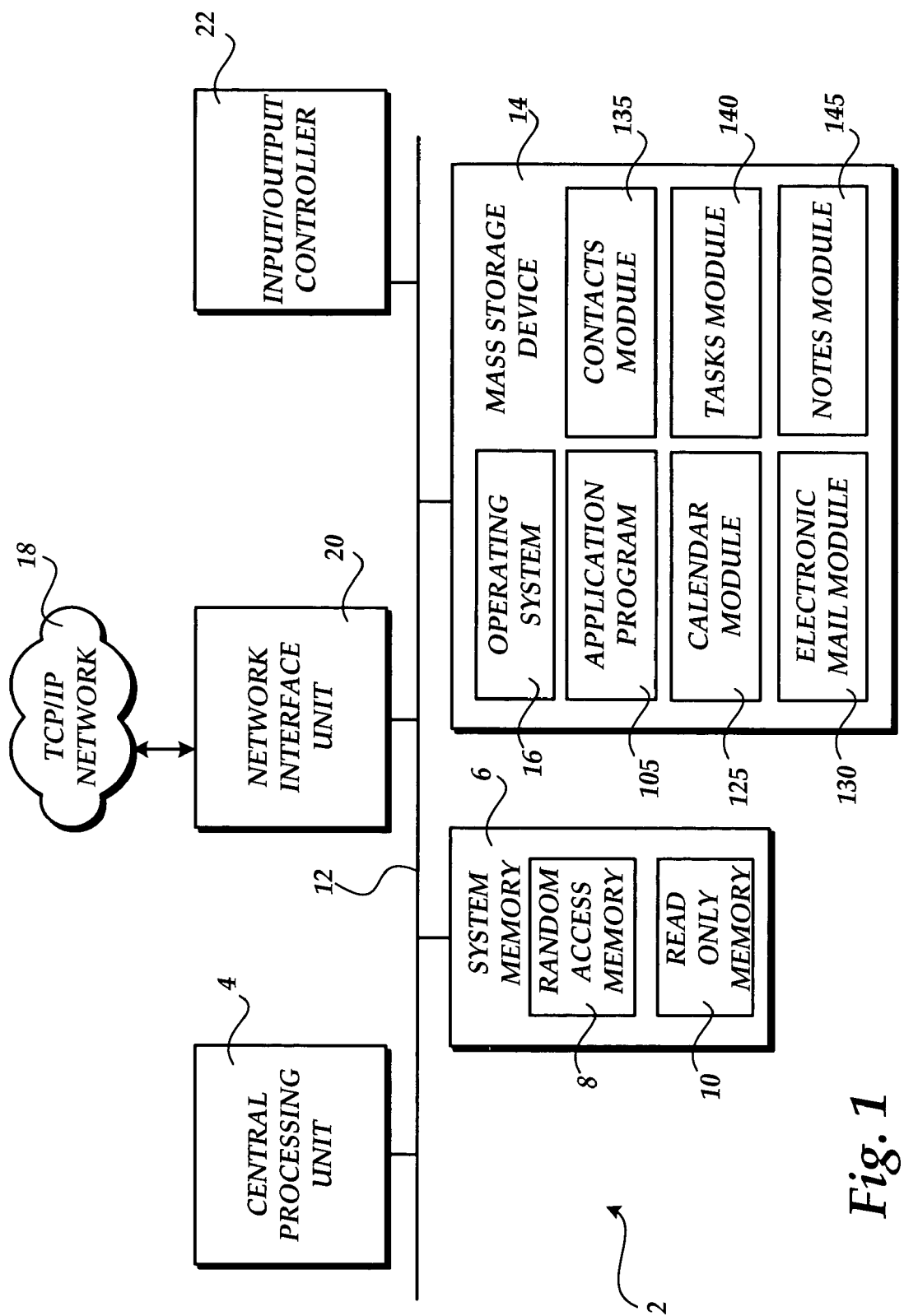
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application 105 for providing a variety of functionalities to a user. For instance, the application 105 may comprise many types of programs such as a word processing application program, a spreadsheet application, a desktop publishing, and the like. According to an embodiment of the present invention, the application 105 comprises a multiple functionality software application for providing a user calendar functionality, electronic tasks functionality, electronic mail functionality, contacts information functionality, electronic notes functionality, electronic journal functionality and the like. Some of the individual program modules comprising the multiple functionality application 105 include a calendar application 125, an electronic mail application 130, a contacts application 135, a tasks application 140, a notes application 145 and a journal application (not shown). An example of such a multiple functionality application 105 is OUTLOOK® manufactured by Microsoft Corporation.

Figure 2:
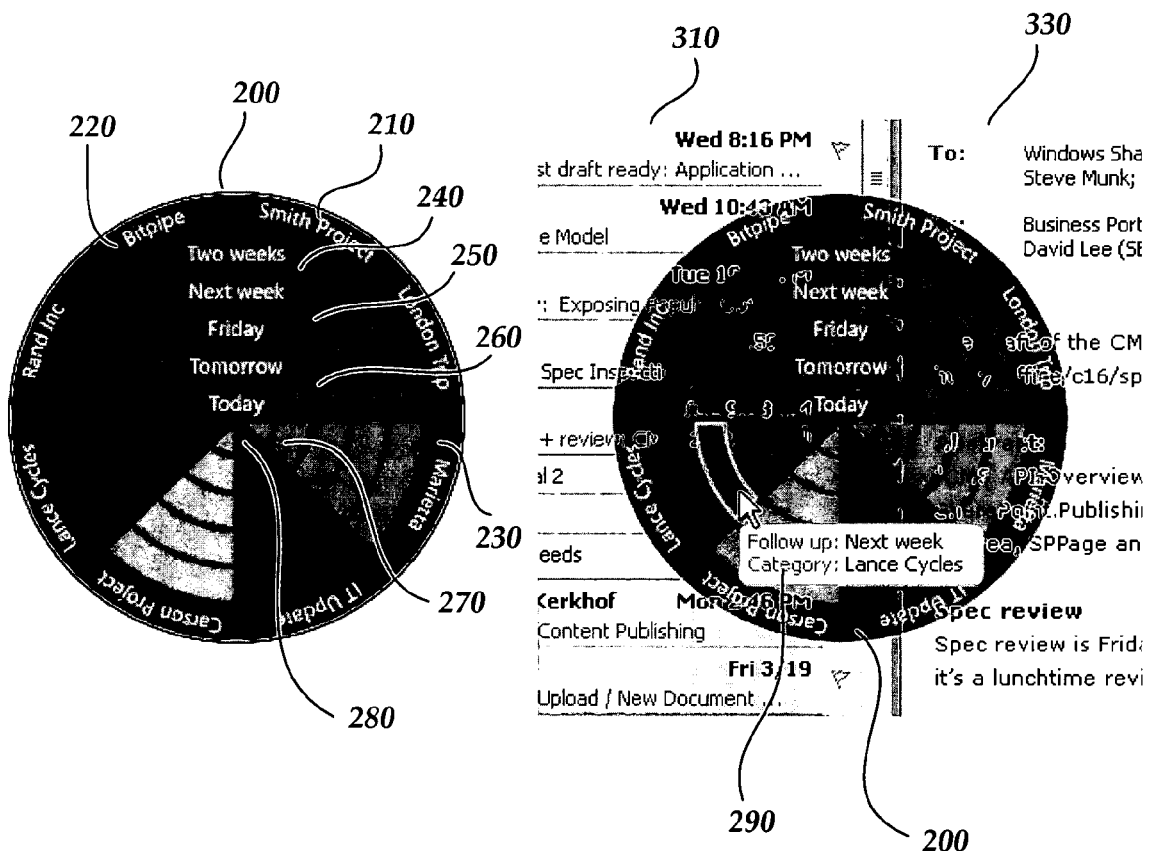
FIG. 2 is illustrates a computer screen display of a two-dimensional radial menu for setting two properties on a selected object by a single user action according to embodiments of the present invention.

Referring now to FIG. 2, a two-dimensional radial menu, according to embodiments of the present invention, is illustrated. Referring to the left side of FIG. 2, the two-dimensional radial menu is a generally pie-shaped user interface that may be utilized for applying two properties or two pieces of metadata to a selected object with a single user action. The radial menu 200 is divided into a number of slices 210, 230. The number of slices into which the radial menu is divided is equal to the number of types of a first property that may be applied to a selected object. The radial menu 200 may be divided into a number of slices, for example between 2 and n slices The radial menu 200 is further divided by one or more concentric circles (dividers) in order to divide each slice of the radial menu into two or more sections. According to embodiments of the present invention, each concentric circle is associated with a type of a second property for application to a selected object. As should be understood, a number of concentric circles may be utilized for dividing the radial menu into sections emanating from the center of the radial menu outward, for example between 1 and n concentric circles.

As illustrated in FIG. 2, intersection of the slices with the one or more concentric circles creates a plurality of bounded areas, 240, 250, 260, 270, 280. According to embodiments of the present invention, each bounded area is designated as a selectable control for automatically applying one type of the first property associated with the slice in which a given bounded area is located and one type of the second property associated with the concentric circles dividing the slice and bounding a given area.

By way of example, the radial menu illustrated in FIG. 2 is associated with the application of start date and task category properties to a selected task item for use by a calendar application 125, a tasks application 140, or a to-do list 340, illustrated below with respect to FIG. 3. Each slice of the radial menu is associated with a type of task category property. For example the slice 220 is associated with a task category of "Bitpipe," the slice 210 is associated with a task category of "Smith Project," the slice 230 is associated with a task category of "Marietta." The concentric circles emanating from the center of the radial menu are associated with types of a start date property. For example, a first concentric circle is associated with a start date of "Today," a second concentric circle is associated with a start date of "Tomorrow," and so on.

Accordingly, the bounded areas created by the intersection of the concentric circles with the slices are thus associated with different combinations of slice properties and concentric circle properties depending on a location in the menu. For example, the area 240 represents a property combination of a start date of "Two Weeks" and a category of "Smith Project." The area 250 represents a property combination of a start date of "Next Week" and a category of "Smith Project." And, the area 260 represents a property combination of a start date of "Friday" and a category of "London" trip.

As should be understood by those skilled in the art, the task category properties and the start date properties described above are for purposes of example only and are not limiting of the application of the two-dimensional radial menu in a variety of different settings. For example, the slices of the radial menu 200 could be associated with text fonts, for example, Times New Roman, Script, Arial and the like. The concentric circles could be associated with text size, for example, 8 pt., 10 pt., 12 pt., and the like. Thus, according to these example properties, each bounded area of each slice of the two-dimensional radial menu would be associated with different combinations of text fonts and text size. For example, one area of the menu might be associated with a text type of Times New Roman and a text size of 12 pts. Another area of the menu might be associated with a text type of Arial and a text size of 8 pts. Yet another section of the menu might be associated with a text type of Times New Roman and a text size of 10 pts.

As described above, each bounded area of the two-dimensional radial menu illustrated in FIG. 2 is designated as a selectable control, and selection of one of the bounded areas 240, 250 in association with a selected object automatically applies the combination of the two property types associated with the selected bounded area to the selected object. For example, following from the print type/print size examples described above, if a user selects a portion of text for applying a desired print type and print size, the user may deploy the radial menu 200 illustrated in FIG. 2 and select a particular area of the radial menu associated with the desired print type, for example, Times New Roman, and desired print size, for example, 12 pts. Upon selection of the appropriate bounded area associated with the desired properties, the two desired properties are automatically applied to the selected text without the requirement of applying each property separately. Following from the task property example described above, if a user is creating a task item for a calendar application, tasks application, or computer-enabled to-do list, the user may apply a task start date and task category to a selected task simultaneously by selecting an appropriate section of the radial menu. For example, a user might select area 280 of the menu, and a task category of "IT Update" and a start date of "Today" are automatically applied to the selected task item.

As illustrated in FIG. 2, each slice of the two-dimensional radial menu 200 is identified by a text title, for example, "Smith Project," "London Trip," and the like. Further, each concentric circle is also identified by a text title, for example, "Two Weeks," "Next Week," and the like. However, as illustrated in FIG. 2, in addition to the text titles identifying each slice and section of the radial menu, color-coding may be utilized for distinguishing between one slice of the radial menu and another. This is particularly advantageous when color-coding is utilized for application of the associated property. For example, according to one embodiment of the present invention, application of task categories to selected tasks is accomplished by color-coding a task flag box associated with a selected task item. For example, a green flag box adjacent to a selected task item may indicate a first category while an orange flag box next to another task item may indicate a second task category. Thus, color-coding each slice of the two-dimensional radial menu 200 according to different types of a given property allows for a visual representation of the different types of the property in the radial menu. Following from the print type/size examples described above, a similar implementation could be utilized where a sample text selection such as an alphabetic character or numeral could be placed above each slice or in each bounded area of the menu that is displayed according to a different print type/size, for example, Times New Roman/12 pts., to visually illustrate to a user the result of application of the selected properties to a selected object.

Referring still to the right portion of FIG. 2, a pop-up tool tip is illustrated. According to one embodiment of the present invention, when a user focuses on a given bounded area (selectable control) of a given slice of the radial menu 200, a pop-up tool tip 290 is deployed for identifying to the user the types of the two properties that will be applied to the selected object if the user actually selects the focused-on area of the radial menu.

Referring to the right portion of FIG. 2, according to embodiments of the present invention, the two-dimensional radial menu 200 is launched as a context menu in association with an object selected for editing by the user. As is well known to those skilled in the art, context menus may be deployed according to a variety of mechanisms. For example, a secondary selection, for example, a right mouse click, on a selected object may cause a context menu, such as the radial menu 200, to deploy. Other mechanisms such as function keys and controls in drop-down tool bar menus may likewise deploy a context menu such as the radial menu 200 in association with a selected object. According to one embodiment of the present invention, the radial menu 200 may be deployed by a primary left-click selection and hold on a selected object, and the radial menu 200 will be launched after a set amount of time, for example, 0.5 seconds. The radial menu 200 will then remain visible for use until the user selects a particular bounded area of the menu. The user may dismiss or cancel the menu by selecting (mouse clicking) outside the radial menu 200.

For example, as illustrated in the right portion of FIG. 2, the two-dimensional radial menu 200 is launched as a translucent display overlaying an electronic mail user interface having an inbox 310 and a selected mail view pane 330. If the user selects a given mail item in the inbox 310 for flagging as a task for inclusion in a tasks application 140 or for inclusion in a calendar application 125, or for inclusion in a computer-enabled to-do list, the radial menu 200 is launched as a context menu, and the slices of the radial menu and concentric circles dividing the radial menu are populated according to the context of the selected item. For example, referring to FIG. 2, if the selected object is an electronic mail item for flagging as a task item, the radial menu slices may be populated according to task categories and the concentric circles of the radial menu may be populated with task start times so that the bounded areas of the slices will allow a user to selectively apply varying start dates for different task categories simultaneously to the selected electronic mail object with a single user action.

For another example, following from the text type/size example described above, if a user selects a text item in a word processing document, the radial menu 200 may be launched as a context menu in the context of a selected text item. For example, as described above, the slices of the radial menu may then be populated with various text types, for example, Times New Roman, and the concentric circles of the radial menu may be populated with various text sizes, for example, 12 pts., so that each bounded area of each slice of the radial menu 200 will allow the user to selectively apply varying text sizes according to different text types to a selected text object with a single user action, for example, a mouse click.

Figure 3:
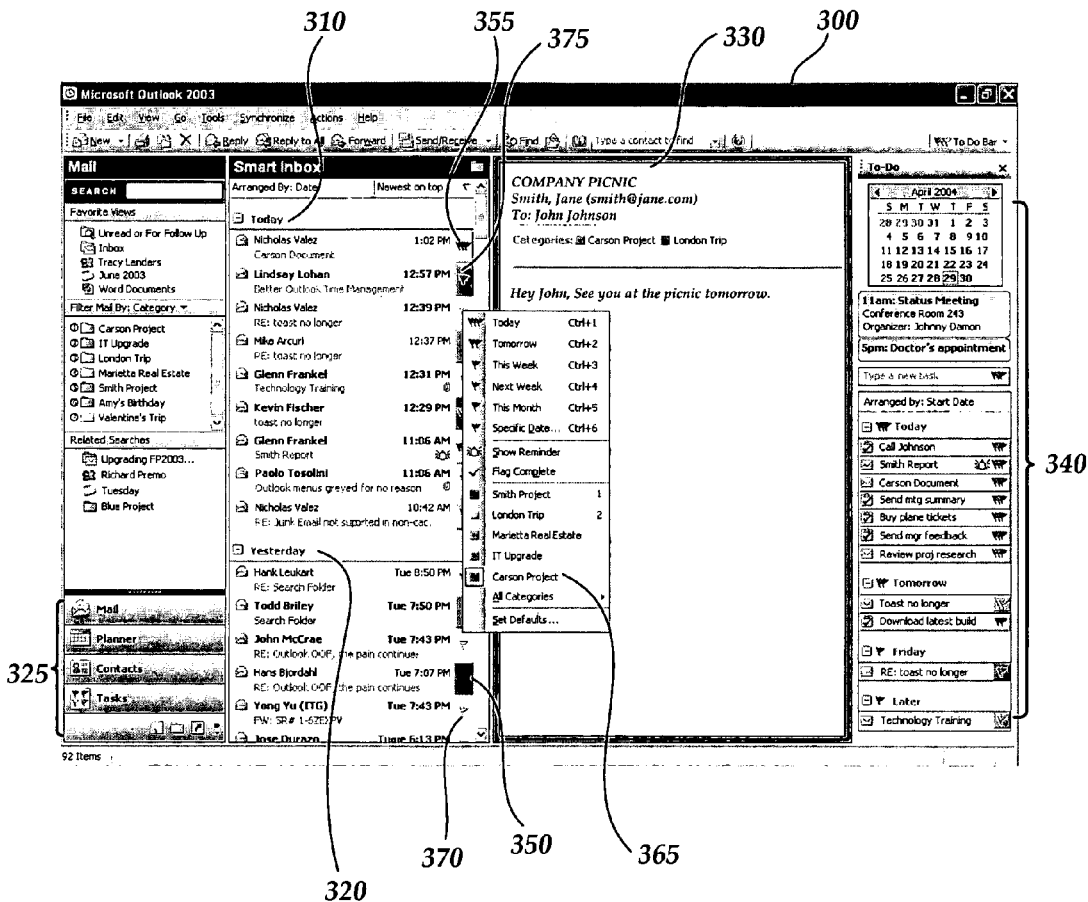
FIG. 3 is illustrates a computer screen display showing an electronic mail application user interface according to embodiments of the present invention.

Referring now to FIG. 3, the radial menu 200 is described in terms of its use as a context menu. FIG. 3 illustrates a computer screen display of an electronic mail application user interface according to embodiments of the present invention. The user interface 300 is illustrative of an electronic mail application 130 user interface for displaying electronic mail items received, sent or stored in a variety of storage folders. An example electronic mail application user interface illustrated in FIG. 2 is provided by OUTLOOK® manufactured and marketed by Microsoft Corporation of Redmond, Wash.

The user interface 300 includes an inbox 210 with which a user may view a listing of electronic mail items that have been received by the user, that have been sent by the user, or which have been stored in one or more user-established storage folders. To the right of the inbox 310, a view or preview pane 330 is illustrated for displaying the contents of a selected mail item. A pop-up context menu 365 is illustrated for applying one or more properties, for example, task start dates and task categories, to a selected mail item so that the flagged mail item establishes a task item bearing the applied properties. Once a mail item is flagged as a task, the properties applied to the mail item, for example, start date and task category, will dictate the position of the correspondingly created task in a task list provided by a tasks application 140 or provided by a task list contained in a To-Do bar 240. For a detailed description of flagging mail items as task items, see U.S. patent application Ser. No. 10/955,232, entitled "Method and System For Improved Electronic Task Creation And Management," which is incorporated herein by reference as if fully set out herein.

According to the context menu 365, illustrated in FIG. 3, a user must select each property to be applied to a selected object separately. For example, if the user desires to apply a start date of "Two Weeks" and a task category of "Smith Project" to a selected flagged mail item or task in the inbox 310, the user must first select the desired start date property and then select the desired task category. However, if the user launches the radial menu 200, illustrated in FIG. 2, instead of the context menu 365 illustrated in FIG. 3, the user may apply the desired properties to the selected task item by a single action (e.g., mouse click) on the area 240 of the radial menu 200 that represents both a task category of "Smith Project" and a start date of "Two Weeks."

As described herein, an improved user interface for allowing a user to apply more than one property or piece of metadata to an object with a single user action is provided. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of applying two properties to a selected object in response to a single action, the method comprising:

launching a pie-shaped user interface in response to receiving a primary selection of the selected object followed by a hold of the selected object, wherein the user interface is displayed until a user selection on the user interface is received;

dividing the pie-shaped user interface into at least two slices, where each of the at least two slices is associated with a different type of a first property, wherein the first property comprises a first set of property types to be applied to the selected object according to a context of the selected object;

further dividing the pie-shaped user interface into at least two circular sections by dividing the user interface with at least one concentric circular divider disposed between a center of the user interface and an outer edge of the user interface, where each of the at least two circular sections is associated with a different type of a second property, wherein the second property comprises a second set of property types to be applied simultaneously with the first property to the selected object according to the context of the selected object;

creating a plurality of bounded areas in the user interface by an intersection of the at least two slices with the at least one concentric circular divider;

coding each of the plurality of bounded areas with a unique color corresponding to the first property of each of the plurality of bounded areas;

designating each of the plurality of bounded areas as a selectable control which, upon the user selection of the selectable control associated with a selected bounded area of the plurality of bounded areas, causes an application of a first type of the first subset of property types of the first property and a second type of the second subset of property types of the second property to the selected object;

applying, upon the user selection of the selected bounded area of the plurality of bounded areas, the unique color associated with the selected bounded area of the plurality of bounded areas to a marker associated with the selected object; and in response to receiving a cursor focus on a given one of the plurality of bounded areas, displaying a tool tip dialog showing the first type of the first subset of property types of the first property and the second type of the second subset of property types of the second property associated with the given one of the plurality of bounded areas.

2. The method of claim 1, further comprising associating, with each of the plurality of bounded areas, the first type of the first subset of property types of the first property and the second type of the second subset of property types of the second property, wherein each of the plurality of bounded areas is associated with a different combination of the first subset of property types of the first property and the second subset of property types of the second property.

3. The method of claim 2, wherein associating, with each of the plurality of bounded areas, the first type of the first subset of property types of the first property and the second type of the second subset of property types of the second property includes associating with each of the plurality of bounded areas a start date property type of a plurality of start date types for application to a task item and a category property type of a plurality of category types for application to the task item, wherein each of the plurality of bounded areas is associated with a different combination of the plurality of start date property types and the plurality category property types.

4. The method of claim 3, wherein coding each of the plurality of bounded areas with the unique color associated with the first property type comprises coding each of the plurality of bounded areas with the unique color associated each category property type of the plurality of category types, and wherein applying the unique color associated with the selected bounded area of the plurality of bounded areas comprises applying the unique color associated with the selected bounded area of the plurality of bounded areas to the selected object.

5. The method of claim 1, further comprising launching the user interface adjacent to the selected object.

6. The method of claim 5, further comprising causing the user interface to be translucent to allow objects over which the launched user interface is displayed to be visible through the launched user interface.

7. The method of claim 1, further comprising launching the user interface in response to receiving a secondary selection of the selected object following the primary selection, wherein receiving the secondary selection of the selected object causes the launching of the user interface.

8. The method of claim 1, wherein the user interface is launched after a set period of time following the primary selection of the selected object.

9. A two-dimensional radial menu displayed by a display device operatively associated with a processing unit coupled to a memory storage having a set of instructions which, when executed by the processing unit, cause the display device to display the two-dimensional radial menu for applying two properties to a selected object in response to a single action, the two-dimensional radial menu comprising:
   a pie-shaped user interface:
      launched in response to receiving a primary selection of the selected object followed by a hold of the selected object for a set period of time,
      displayed until a user selection on the user interface is received,
      divided into at least two slices, where each of the at least two slices is associated with a different type of a first property, wherein the first property comprises a first subset of property types to be applied to the selected object according to the context of the selected object, and
      further divided into at least two circular sections by at least one concentric circular divider disposed between a center of the user interface and an outer edge of the user interface, where each of the at least two circular sections is associated with a different type of a second property, wherein the second property comprises a second subset of property types to be applied simultaneously with the first property to the selected object according to the context of the selected object;
   a plurality of bounded areas in the user interface formed by a intersection of the at least two slices with the at least one concentric circular divider, wherein each of the plurality of bounded areas is designated as a selectable control which, upon receiving the user selection of the selectable control, causes an application of a first type of the first subset of property types of the first property and a second type of the second subset of property types of the second property to the selected object, and wherein each of the plurality of bounded areas is coded with a unique color corresponding to the first property of each of the plurality of bounded areas; and
   a tool tip dialog showing the first type of the first subset of property types of the first property and the second type of the second subset of property types of the second property associated with a given one of the plurality of bounded areas displayed in response to receiving a cursor focus on the given one of the plurality of bounded areas.

10. The two-dimensional radial menu of claim 9, wherein the first property comprises a start date property for application to a task item and the second property comprises a category property for application to the task item, wherein each of the plurality of bounded areas is associated with a different combination of the start date property and the category property.

11. The two-dimensional radial menu of claim 10, wherein the unique color further corresponds with the category property type, wherein, upon the user selection of the selectable control, the unique color associated with the bounded area containing the given selectable control is applied to the selected object.

12. The two-dimensional radial menu of claim 9, wherein the two-dimensional radial menu is translucent to allow objects over which the two-dimensional radial menu is displayed to be visible through the two-dimensional radial menu.

13. A computer-readable storage medium containing computer-executable instructions which when executed by a computer perform a method of applying two properties to a selected object in response to a single action, the method executed by the computer-executable instructions comprising:
   launching a pie-shaped user interface adjacent to the selected object in response to receiving a primary selection of the selected object by a left mouse click on the object followed by a hold of the selected object, wherein the user interface is displayed until a user selection on the user interface is received;
   dividing the pie-shaped user interface into at least two slices, where each of the at least two slices is associated with a different type of a first property, wherein the first property comprises a first subset of property types to be applied to the selected object according to the context of the selected object;
   further dividing the pie-shaped user interface into at least two circular sections by dividing the user interface with at least one concentric circular divider disposed between a center of the user interface and an outer edge of the user interface, where each of the at least two circular sections is associated with a different type of a second property, wherein the second property comprises a second subset of property types to be applied simultaneously with the first property to the selected object according to the context of the selected object;
   creating a plurality of bounded areas in the user interface by an intersection of the at least two slices with the at least one concentric circular divider;
   associating, with each of the plurality of bounded areas, a first type of the first subset of property types of the first property and a second type of the second subset of property types of the second property, wherein each of the plurality of bounded areas is associated with a different combination of the first subset of property types of the first property and the second subset of property types of the second property;
   coding each of the plurality of bounded areas with a unique color corresponding to the first property of each of the plurality of bounded areas;
   designating each of the plurality of bounded areas as a selectable control which, upon receiving the user selection of the selectable control associated with a selected bounded area of the plurality of bounded areas, causes an application of a first type of the first subset of property types of the first property and a second type of the second subset of property types of the second property to the selected object; and
   in response to receiving a cursor focus on a given one of the plurality of bounded areas, displaying a tool tip dialog showing the first type of the first subset of property types of the first property and the second type of the second subset of property types of the second property associated with the given one of the plurality of bounded areas.

14. The computer-readable storage medium of claim 13, wherein associating, with each of the plurality of bounded areas, the first type of the first subset of property types of the first property and the second type of the second subset of property types of the second property includes associating with each of the plurality of bounded areas a start date property type of a plurality of start date types for application to a task item and a category property type of a plurality of category types for application to the task item, wherein each of the plurality of bounded areas is associated with a different combination of the plurality of start date property types and the plurality category property types.

15. The computer-readable storage medium of claim 14, wherein the unique color further corresponds with each category property type of the plurality of category property types, and, upon the user selection of a given selectable control, applying the unique color associated with the corresponding bounded area of the plurality of bounded areas containing the given selectable control to the selected object.

16. The computer-readable storage medium of claim 13, further comprising causing the user interface to be translucent to allow objects over which the launched user interface is displayed to be visible through the launched user interface.

17. The computer-readable storage medium of claim 13, further comprising launching the user interface in response to receiving a secondary selection of the selected object following the primary selection, wherein receiving the secondary selection of the selected object causes the launching of the user interface.

18. The two-dimensional radial menu of claim 11, wherein, upon the user selection of the selectable control, the unique color associated with the bounded area containing the given selectable control is further applied to a flag associated with the selected object.

19. The computer-readable storage medium of claim 13, further comprising applying, upon the user selection of the selected bounded area of the plurality of bounded areas, the unique color associated with the selected bounded area of the plurality of bounded areas to a flag associated with the selected object.

\* \* \* \* \*